US012737245B2

(12) United States Patent
Clinton

(10) Patent No.: US 12,737,245 B2
(45) Date of Patent: Sep. 15, 2026

(54) MEMORY ACCESS VALIDATION FOR INPUT/OUTPUT OPERATIONS USING AN INTERPOSER

(71) Applicant: Advanced Micro Devices, Inc., Santa Clara, CA (US)

(72) Inventor: David Joseph Clinton, Coopersburg, PA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 50 days.

(21) Appl. No.: 18/374,311

(22) Filed: Sep. 28, 2023

(65) Prior Publication Data

US 2025/0110819 A1 Apr. 3, 2025

(51) Int. Cl.

*G06F 11/00* (2006.01)
*G06F 11/07* (2006.01)
*G06F 11/10* (2006.01)

(52) U.S. Cl.

CPC ...... *G06F 11/0772* (2013.01); *G06F 11/0787* (2013.01); *G06F 11/1004* (2013.01)

(58) Field of Classification Search

None
See application file for complete search history.

(56) References Cited

U.S. PATENT DOCUMENTS

RE36,448 E * 12/1999 Brady ................ G11B 20/1833
714/763
9,384,086 B1 * 7/2016 Craddock ............... G06F 13/00
10,078,541 B2 * 9/2018 Benedict ............. G06F 11/0763
2011/0066925 A1 * 3/2011 Smith ..................... G06F 11/10
714/E11.032
2011/0078537 A1 * 3/2011 Gruner .............. H03M 13/6566
714/758
2017/0187389 A1 * 6/2017 Radhakrishnan ... H03M 13/091
2019/0138440 A1 * 5/2019 Lee ....................... G06F 3/0679
2019/0332469 A1 * 10/2019 Radjai ................... G06F 9/3816
2025/0165145 A1 * 5/2025 Peterson ............... G06F 3/0679
2025/0390380 A1 * 12/2025 Mahanty ............. G06F 11/1044

OTHER PUBLICATIONS

Google Scholar/Patents search—text refined (Year: 2025).*
Google Scholar/Patents search—text refined (Year: 2026).*
Satran, Julian , et al., "Out of Order Incremental CRC Computation", IEEE Transactions on Computers, vol. 54. No. 9 [retrieved Aug. 18, 2023]. Retrieved from the Internet <https://doi.org/10.1109/TC.2005.151>, Jul. 25, 2005, 4 pages.

* cited by examiner

*Primary Examiner* — Christopher S Mccarthy
(74) *Attorney, Agent, or Firm* — FIG. 1 Patents

(57) ABSTRACT

Memory access validation for input/output operations using an interposer is described. In one or more implementations, an interposer is disposed logically between an input/output device and a memory. The interposer receives a plurality of requests from the input/output device to access the memory non-sequentially in association with an input/output operation. Responsive to each request, the interposer updates an accumulated error code using error-detection logic. Based upon the accumulated error code, the interposer outputs an I/O validity indicator.

20 Claims, 5 Drawing Sheets

MEMORY ACCESS VALIDATION FOR INPUT/OUTPUT OPERATIONS USING AN INTERPOSER

BACKGROUND

Various operations of computing systems involve transferring data between memory (e.g., main memory) and other devices (e.g., peripheral devices). Advances in memory access techniques continue to be sought to improve performance of the computing systems. One example advance is direct memory access or "DMA," which is a technique used to enhance data transfer efficiency between devices and memory. Instead of relying on a central processing unit (CPU) for every data transfer, direct memory access allows the devices to directly access the memory without CPU intervention. This greatly reduces the CPU's workload and improves overall system performance.

Direct memory access is particularly beneficial when dealing with non-sequential accesses. In traditional CPU-based transfers, data is typically transferred sequentially, with the CPU fetching each piece of data one after the other. However, some devices, such as hard drives or network interfaces, may need to access data in a non-sequential or scattered manner. Direct memory access efficiently handles these non-sequential accesses by allowing the device to independently request and retrieve the required data blocks from memory.

DETAILED DESCRIPTION

Overview

Figure 1:
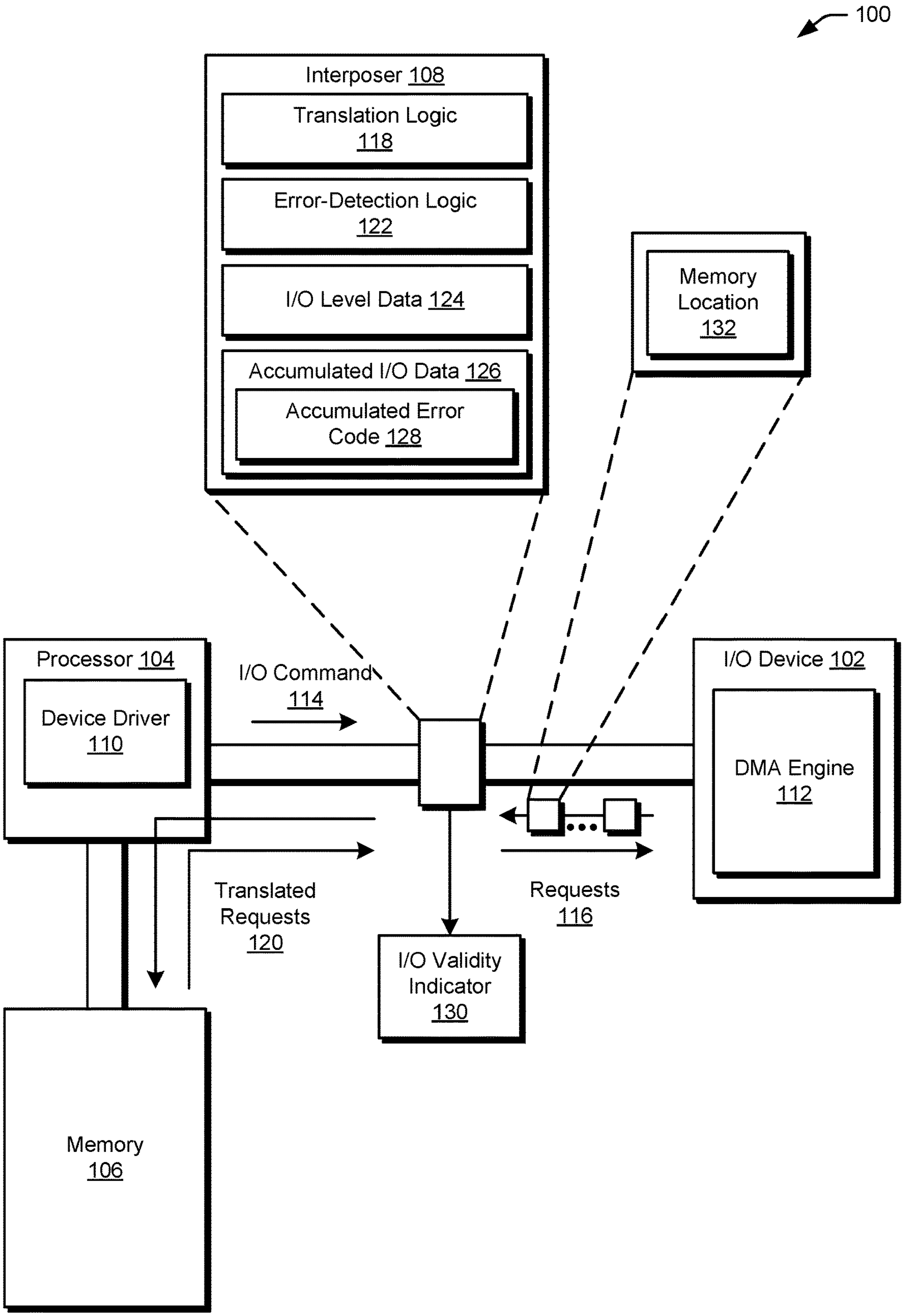
FIG. 1 is a block diagram of a non-limiting example system having a memory and an interposer operable to validate memory accesses of an input/output (I/O) device for an I/O operation.

Input/output (I/O) operations of computing systems involve transferring data between memory (e.g., main memory) and other devices (e.g., peripheral devices). Accessing this memory can be complex since multiple I/O operations can be happening at the same time and data can be generated very quickly. Further, the computing systems must generally track the validity of this data to assure the validity of the I/O operations.

Due to the quick and continuous generation of data by I/O operations, it is important that methods and systems for testing and assuring the validity of the I/O operations be expedient. This can be particularly challenging if, during the I/O operations, memory needs to be accessed non-sequentially. The described memory access validation for input/output operations using an interposer assures validity of I/O operations where memory is accessed in a non-sequential order. Rather than storing bit vectors to track which portions of memory are accessed by a sequence of requests (e.g., that request non-sequential access to memory), the described techniques store error codes (e.g., a pair of cyclic redundancy codes) and validate I/O operations based on those error codes. For I/O operations involving large accesses, e.g., 2-gigabyte operations, the error codes of the described techniques are much smaller than bit vectors for tracking which portions of memory are accessed. Thus, hardware configured according to the described techniques need not include storage for potentially large bit vectors.

In some aspects, the techniques described herein relate to a device including: an interposer disposed logically between an input/output device and a memory to: receive a plurality of requests from the input/output device to access the memory non-sequentially in association with an input/output operation, responsive to each request, update an accumulated error code using error-detection logic, and output an input/output validity indicator for the input/output operation based on the accumulated error code.

In some aspects, the techniques described herein relate to a device, wherein the interposer is further configured to validate the input/output operation based on the accumulated error code.

In some aspects, the techniques described herein relate to a device, wherein the plurality of requests is received from a direct memory access engine of the input/output device.

In some aspects, the techniques described herein relate to a device, wherein the input/output device is a non-volatile memory express (NVMe) device and the interposer is an NVMe interposer.

In some aspects, the techniques described herein relate to a device, wherein error-detection logic of the interposer performs incremental cyclic redundancy code (CRC) calculations for each request on a per-request basis as a request is received to update the accumulated error code.

In some aspects, the techniques described herein relate to a device, wherein the error-detection logic includes a linear feedback shift register (LFSR) for performing the incremental cyclic redundancy code (CRC) calculations.

In some aspects, the techniques described herein relate to a device, wherein the interposer is further configured to validate the input/output operation based on the accumulated error code and an input/output level error code.

In some aspects, the techniques described herein relate to a device, wherein the accumulated error code and the input/output level error code are cyclic redundancy codes (CRCs).

In some aspects, the techniques described herein relate to a device, wherein the interposer stores both the accumulated error code and the input/output level error code.

In some aspects, the techniques described herein relate to a device, wherein the interposer stores both the accumulated error code and the input/output level error code without storing a virtual bit vector having a number of bits which corresponds to a number of bytes of the input/output operation.

In some aspects, the techniques described herein relate to a device, wherein: error-detection logic of the interposer updates the accumulated error code for a request based on a number of bytes of memory requested for access by the request and an indication of which particular bytes of the memory are requested, and the error-detection logic updates the input/output level error code for the request based on the number of bytes of memory requested.

In some aspects, the techniques described herein relate to a device, wherein the error-detection logic updates the input/output level error code for the request based on the number of bytes of memory requested by the request and agnostic to which particular bytes of the memory are requested.

In some aspects, the techniques described herein relate to a device, wherein the interposer is further configured to translate the plurality of requests to produce a plurality of translated requests for accessing respective portions of the memory.

In some aspects, the techniques described herein relate to a device, wherein the plurality of translated requests are formatted according to a different protocol than the plurality of requests.

In some aspects, the techniques described herein relate to a system including: a memory, an input/output device to generate a plurality of requests to access the memory non-sequentially in association with an input/output operation, and an interposer disposed logically between the memory and the input/output device, the interposer having error-detection logic to update an accumulated error code based on each request and output an input/output validity indicator based on the accumulated error code.

In some aspects, the techniques described herein relate to a system, wherein the input/output device includes a direct memory access engine to generate the plurality of requests to directly access the memory non-sequentially.

In some aspects, the techniques described herein relate to a system, wherein the interposer is further configured to use the error-detection logic to update an input/output level error code based on each request, the interposer updating the input/output level error code based on different input information than the accumulated error code.

In some aspects, the techniques described herein relate to a system, wherein the interposer is further configured to validate the input/output operation based on both the accumulated error code and the input/output level error code.

In some aspects, the techniques described herein relate to a system, wherein the interposer is further configured to validate the input/output operation based on whether the accumulated error code and the input/output level error code are equal.

In some aspects, the techniques described herein relate to a method including: receiving, by an interposer and from an input/output device, a plurality of requests to access memory non-sequentially in association with an input/output operation, responsive to each request, updating an accumulated error code, and outputting, by the interposer, an input/output validity indicator based on the accumulated error code.

FIG. 1 is a block diagram of a non-limiting example system 100 having a memory and an interposer operable to validate memory accesses of an input/output (I/O) device for an I/O operation. In this example, the system 100 includes an input/output device 102 (also referred to herein as "I/O device 102"), a processor 104, and a memory 106. In accordance with the described techniques, the system 100 also includes an interposer 108 disposed logically between the I/O device 102 and the memory 106 to validate memory accesses for I/O operations performed by the I/O device 102. In one or more implementations, the processor 104 includes a device driver 110 to control operation of the I/O device 102, e.g., to command the I/O device to perform an I/O operation. Additionally or alternatively, the I/O device 102 includes a direct memory access engine 112 (also referred to herein as a "DMA engine 112") to access (e.g., read and/or write) data in the memory 106 directly in connection with one or more I/O operations performed by the I/O device 102.

In accordance with the described techniques, the I/O device 102, the processor 104, the memory 106, and the interposer 108, are coupled to at least one other of the I/O device 102, the processor 104, the memory 106, and the interposer 108, via a wired or wireless connection. Example wired connections include, but are not limited to, memory channels, buses (e.g., a data bus), interconnects, through silicon vias, traces, and planes. In one example, at least one of the connections is a PCI Express (PCIe) bus. Other example connections include optical connections, fiber optic connections, and/or connections or links based on quantum entanglement.

Examples of devices or apparatuses in which the system 100 is implemented include, but are not limited to, a personal computer (e.g., a desktop or tower computer), a smartphone or other wireless phone, a tablet or phablet computer, a notebook computer, a laptop computer, a wearable device (e.g., a smartwatch, an augmented reality headset or device, a virtual reality headset or device), an entertainment device (e.g., a gaming console, a portable gaming device, a streaming media player, a digital video recorder, a music or other audio playback device, a television, a set-top box), an Internet of Things (IoT) device, an automotive computer, and other computing devices or systems.

In one or more variations, the components of the system 100 are operable to implement an architecture according to the non-volatile memory host controller interface specification or NVMHCIS, which is referred to in shorthand as NVMe and stands for NVM Express. By way of example and not limitation, for instance, the I/O device 102 is configured as an NVMe device, the device driver 110 executed by the processor 104 is a host NVMe driver, portions of memory 106 allocated for an I/O operation of the NVMe device are allocated as one or more host I/O buffers, and the interposer 108 includes an interposer NVMe driver as well as logic to translate requests to access the memory 106, such as logic for encrypting the requests, an example of which is inline AES-XTS, which stands for Advanced Encryption Standard (AES) XEX-based tweaked-codebook mode with cipher text stealing (XTS). In variations, the system 100 is operable to use the interposer 108 to validate memory accesses for I/O operations of the I/O device 102 in different types of architectures without departing from the spirit or scope of the described techniques.

The processor 104 is an electronic circuit that performs various operations on and/or using data in the memory 106. Examples of the processor 104 include, but are not limited to, a central processing unit (CPU), a graphics processing unit (GPU), a field programmable gate array (FPGA), an accelerator, an accelerated processing unit (APU), and a digital signal processor (DSP), to name a few. In variations, the processing unit includes one or more "cores," where a core is a processing unit that reads and executes instructions (e.g., of a program), examples of which include to add, to move data, and to branch. In scenarios where the processor 104 includes more than one core, the processor 104 may be referred to as a multi-core processor.

The memory 106 is a device or system that is used to store information, such as for immediate use in a device, e.g., by the processor 104, by the direct memory access engine 112, by an in-memory processor (not shown), which is referred to as a processing-in-memory component or PIM component. In one or more implementations, the memory 106 corresponds to semiconductor memory where data is stored within memory cells on one or more integrated circuits. In at least one example, the memory 106 corresponds to or includes volatile memory, examples of which include random-access memory (RAM), dynamic random-access memory (DRAM), synchronous dynamic random-access memory (SDRAM), static random-access memory (SRAM), and memristors.

The memory 106 is packaged or configured in any of a variety of different manners. Examples of such packaging or configuring include a dual in-line memory module (DIMM), a small outline DIMM (SO-DIMM), a registered DIMM (RDIMM), a non-volatile DIMM (NVDIMM), a ball grid array (BGA) memory permanently attached to (e.g., soldered to) a printed circuit board, and so forth.

Examples of types of DIMMs include, but are not limited to, synchronous dynamic random-access memory (SDRAM), double data rate (DDR) SDRAM, double data rate 2 (DDR2) SDRAM, double data rate 3 (DDR3) SDRAM, double data rate 4 (DDR4) SDRAM, and double data rate 5 (DDR5) SDRAM. In at least one variation, the memory 106 is configured as or includes a SO-DIMM or an RDIMM according to one of the above-mentioned standards, e.g., DDR, DDR2, DDR3, DDR4, and DDR5.

Alternatively or in addition, the memory 106 corresponds to or includes non-volatile memory, examples of which include flash memory, read-only memory (ROM), programmable read-only memory (PROM), erasable programmable read-only memory (EPROM), electronically erasable programmable read-only memory (EEPROM), and non-volatile random-access memory (NVRAM), such as phase-change memory (PCM) and magneto resistive random-access memory (MRAM). The memory 106 is configurable in a variety of ways capable of supporting requests from the I/O device 102 for accessing the memory 106, e.g., to read data from and/or write data to the memory 106.

Further examples of memory configurations include low-power double data rate (LPDDR), also known as LPDDR SDRAM, which is a type of synchronous dynamic random-access memory. In variations, LPDDR consumes less power than other types of memory and/or has a form factor suitable for mobile computers and devices, such as mobile phones. Examples of LPDDR include, but are not limited to, low-power double data rate 2 (LPDDR2), low-power double data rate 3 (LPDDR3), low-power double data rate 4 (LPDDR4), and low-power double data rate 5 (LPDDR5). It is to be appreciated that the memory 106 is configurable in a variety of ways without departing from the spirit or scope of the described techniques.

In one or more implementations, the device driver 110 issues an I/O command 114 to the I/O device 102, such as to control the I/O device 102. For example, the device driver 110 issues the I/O command 114 in connection with execution of an application (not shown) on the processor 104. Broadly, the I/O command 114 instructs the I/O device 102 to perform an I/O operation, such as by accessing one or more portions of the memory 106. In one or more implementations, the I/O command 114 includes a size of the I/O operation and location of a respective data buffer in the memory 106, e.g. the host memory. The device driver 110 is an instantiation of software executing on the processor 104 that enables communication between an operating system (e.g., implemented by the system 100) and the I/O device 102. Broadly, the device driver 110 acts as an intermediary between the hardware (i.e., the I/O device 102) and the operating system.

In accordance with the described techniques, the I/O device 102 sends requests 116 (e.g., multiple memory access requests) to access (e.g., read from or write to) various portions of the memory 106 to carry out the I/O operation, such as responsive to the I/O command 114. In at least one variation, for instance, the direct memory access engine 112 generates the requests 116 and causes them to be transmitted over a connection for directly accessing respective portions of the memory 106, in accordance with DMA techniques. In at least some scenarios, the requests 116 request access to portions of the memory 106 non-sequentially. For example, at least two of the requests 116 issued by the I/O device 102 consecutively request access to non-sequential portions of the memory 106, e.g., non-sequential address ranges.

In accordance with the described techniques, the I/O device 102 is any of a variety of hardware devices capable of handling an I/O command 114 from a respective device driver executing on the processor 104, and carrying out the corresponding I/O operation by accessing (e.g., directly) one or more portions of the memory 106, e.g., one or more addresses of a contiguous portion of memory allocated to the I/O device 102 by the respective device driver for performing the commanded I/O operation. Examples of such I/O devices include but are not limited to data stores, such as one or more of a solid-state drive (SSD), a flash drive, a hard disk drive (HDD), a universal serial bus (USB) drive, and so on; communication devices, such as one or more of a network adapter, a Bluetooth (or other type of wireless communication) adapter and/or dongle, a modem, and so on; and/or peripherals. It is to be appreciated that in variations, the I/O device 102 is a different device without departing from the spirit or the scope of the techniques described herein.

As noted above, in one or more implementations, the direct memory access engine 112 controls memory access (or at least a portion of the memory access) by the I/O device 102, such as memory accesses requested in connection with carrying out an I/O operation as instructed by the I/O command 114. In at least one implementation, the direct memory access engine 112 is hardware integral with or integrated into the I/O device 102. In one or more implementations, for example, the direct memory access engine 112 includes a controller that manages the transfer of data between the I/O device 102 (e.g., solid state or flash drives of the I/O device 102) and the memory 106 and further includes a set of buffers for at least temporarily storing data during the transfer.

In one or more implementations, the direct memory access engine 112 initiates transfers of data automatically based on preconfigured settings, and/or the direct memory access engine 112 can be programmed by the processor 104 (e.g., a CPU) to perform specific transfers. Broadly, the direct memory access engine 112 enables high-speed data transfers without involving the processor 104 (e.g., the CPU). Rather than relying on a processor (e.g., a CPU) to manage data transfers, the direct memory access engine 112 directly accesses the memory 106 and transfers data with the I/O device 102, which improves performance (e.g., throughput of a CPU) and reduces processor (e.g., CPU) overhead.

The interposer 108 is a hardware device disposed logically between the I/O device 102 and the memory 106. The interposer 108 intercepts and translates the requests 116 using translation logic 118 to produce translated requests 120, which are then used to access portions of the memory 106. In one example, for instance, the translated requests 120 are formatted according to a different protocol (SATA) than the requests 116 (NVMe). In variations, the translation logic 118 translates the requests 116 for any of a variety of purposes, such as for encryption and/or otherwise to obfuscate the requests 116. In implementations involving an NVMe architecture, for example, e.g., where the interposer 108 is an NVMe interposer, the interposer 108 acts as a bridge between the I/O device 102 and an existing interface of the processor 104 and/or the memory 106, such as an existing serial ATA (SATA) interface and/or a serial attached SCSI (SAS) interface. In other words, in such implementations, the interposer 108 translates the communications (e.g., the requests 116) received in the NVMe protocol to the protocol used by the interface of other portions of the system 100, and vice versa, allowing the I/O device 102 to communicate with the other portions of the system 100, e.g., the processor 104 and/or the memory 106.

In addition to the translation logic 118, the interposer 108 is depicted including error-detection logic 122, I/O level data 124, and accumulated I/O data 126, which includes accumulated error code 128. In variations, the interposer 108 includes more, fewer, and/or different components than the translation logic 118 and the error-detection logic 122 and is configured to maintain more, fewer, and/or different data than the I/O level data 124 and the accumulated I/O data 126 without departing from the spirit or scope of the described techniques.

Broadly, the interposer 108 uses the error-detection logic 122, the I/O level data 124, and the accumulated I/O data 126 to validate the requests 116 for accessing the memory 106 in connection with an I/O operation instructed by the I/O command 114. In one or more implementations, for instance, the interposer 108 uses the error-detection logic 122 as the requests 116 are received. For example, the interposer 108 uses the error-detection logic 122 to update the accumulated error code 128 responsive to receipt of each of the requests 116, e.g., to update the accumulated error code 128 on a per-request basis.

The interposer 108 then outputs an I/O validity indicator 130 which indicates whether the I/O operation, carried out via the requests 116 to access memory, is valid or invalid. For example, after the interposer 108 receives an indication, e.g., from the I/O device 102, that the I/O operation is complete, the interposer 108 outputs the I/O validity indicator 130. As discussed in more detail below, the I/O validity indicator 130 is based on the accumulated error code 128. In variations, the interposer 108 outputs the I/O validity indicator 130 to the processor 104, the I/O device 102, and/or some other component communicatively coupled to the system 100.

The processor 104, the I/O device 102, and/or the other component then perform one or more operations based on whether the I/O operation is indicated valid or invalid. If the I/O validity indicator 130 indicates that the I/O operation is invalid, for instance, in one or more variations, the processor 104 performs an action, such as to inform an operating system that the I/O operation is invalid (e.g., "throws an error"), issue another I/O command instructing the I/O device 102 to attempt to perform the I/O operation again, and/or discard or otherwise ignore the invalid I/O operation and continue with a next operation. Alternatively or additionally, the I/O device 102 performs an action, such as to attempt to perform the I/O operation again with or without an instruction or command from the processor 104 to do so. If the I/O validity indicator 130 indicates that the I/O operation is valid, however, in one or more variations, the processor 104 performs an action such as to inform an operating system that the I/O operation is valid, issue a next I/O command that is based on successful performance of the I/O operation instructed by the I/O command 114, and so forth. Alternatively or additionally, the I/O device 102 performs an action based on successful performance of the I/O operation instructed by the I/O command 114.

By validating the I/O operation using the error-detection logic 122 and the accumulated error code 128, the interposer 108 improves handling of non-sequential memory accesses (e.g., from a DMA engine) in connection with an I/O operation relative to conventional techniques. Using the described techniques, for instance, the interposer 108 stores less data to track memory accesses than conventional techniques, e.g., by storing an incremental cyclic redundancy code (CRC) representing the accumulated error code, while still tracking whether each location in the allocated portion of memory is accessed once during the course of the I/O operation and is only accessed once, e.g., based further on storing a CRC representing an I/O level error code indicative of how many bytes of memory are accessed and agnostic to which particular bytes are accessed.

In one or more implementations, as part of the I/O operation, the interposer 108 receives at least some of the I/O level data 124 via the I/O command 114 that is received from the processor 104. Alternatively or in addition, the interposer 108 receives at least some of the I/O level data 124 in a header of the data packets corresponding to the requests 116. In at least one variation, the interposer 108 receives such information before the requests 116. In one or more implementations, the I/O level data 124 includes an I/O size, such as a size of the memory 106 allocated for the I/O operation in bytes.

In one or more implementations, the accumulated error code 128, which is updated by the error-detection logic 122 as the requests 116 are received, is based at least in part on the I/O size and which portions of the memory 106 are requested by each of the requests 116. In at least one variation, the error-detection logic 122 is hardware that performs incremental cyclic redundancy code (CRC) calculations for each of the requests 116, on a per-request basis, as they are received. In one or more implementations, for example, the error-detection logic 122 is or includes a linear feedback shift register (LFSR). In at least one variation, the accumulated error code 128 thus corresponds to a cyclic redundancy code updated by the error-detection logic 122 with each request. In other words, the error-detection logic 122 outputs the accumulated error code 128 in association with receipt of each request, such that the accumulated error code 128 accumulates an effect of processing information (e.g., by a LFSR) for each request.

Figure 2:
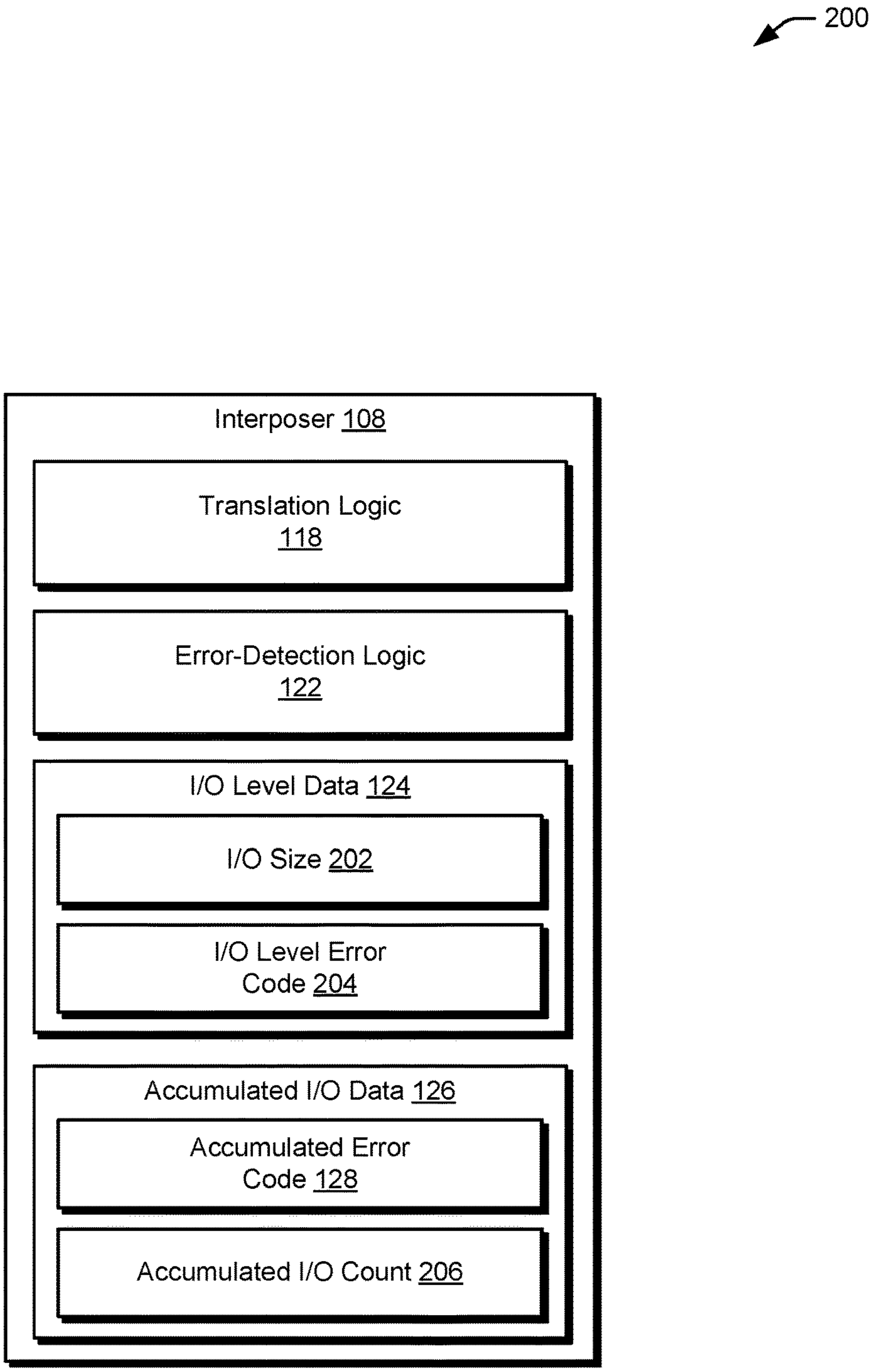
FIG. 2 is a block diagram of a non-limiting example of an interposer.

In the context of how the interposer 108 generates the accumulated error code 128 and uses the accumulated error code 128 to validate an I/O operation in one example, consider the following discussion of FIG. 2.

FIG. 2 is a block diagram of a non-limiting example 200 of an interposer.

In particular, FIG. 2 includes the interposer 108 having the translation logic 118, the error-detection logic 122, the I/O level data 124, and the accumulated I/O data accumulated I/O data 126. In this example, the I/O level data 124 includes I/O size 202 and I/O level error code 204. The accumulated I/O data 126 includes the accumulated error code 128 and an accumulated I/O count 206.

In accordance with the described techniques, the interposer 108 receives the requests 116, and in at least some scenarios, an order in which the requests 116 are received by the interposer 108, causes access to be requested for non-sequential portions of the memory 106. Each of the requests 116 specifies a memory location 132 associated with the request, e.g., an address and/or range of addresses of the memory 106 that is to be read from or written to based on the request. In one or more implementations, the memory location 132 is specified as an offset (e.g., from a starting byte of an allocated portion of memory) and a size of the request (e.g., in number of bytes).

In one or more implementations, responsive to receipt of a request 116, the interposer 108 updates the accumulated I/O count 206 (e.g., increments the accumulated I/O count 206) and computes the accumulated error code 128 using the error-detection logic 122. In one or more implementations, the error-detection logic 122 receives as input a first virtual bit vector that is particular to the request. This bit vector is "virtual" insofar as it is data and/or signals received or generated by the interposer 108 that represents a bit vector which includes one bit per byte of the I/O operation and also represents that a subset of bits of the of the bit vector are set which correspond to the portion of memory for which access is requested by the particular request—but the data and/or signals are not an actual bit vector having a size of a bit per byte of the I/O operation.

Consider an example in which the I/O operation corresponds to a two gigabyte I/O operation and in which the interposer 108 receives a request to access 16 bytes of the memory 106 as part of the I/O operation. In this example, the virtual bit vector (e.g., the data and/or signals) provided as input to the error-detection logic 122 represents that 16 bits of a 2,000,000,000-bit bit vector are set, where the 16 bits correspond to the particular 16 bytes of memory requested by the request. This virtual bit vector is provided as input instead of providing a 2,000,000,000-bit bit vector as input to the error-detection logic 122.

In one or more implementations, the virtual bit vector—e.g., the data or signals representative of the actual bytes of memory accessed due to the request—that is provided as input to the error-detection logic 122 corresponds to or otherwise indicates an offset and a number of bytes accessed by the request. Due to this, the described techniques avoid storing an actual bit vector, such as the 2,000,000,000-bit bit vector of the above example, and reduce a storage burden on the interposer 108 by storing the accumulated error code 128 without storing an actual bit vector for the I/O operation. The error-detection logic 122 then processes the input data according to one or more error detection algorithms (e.g., a cyclic redundancy code (CRC)) and outputs the accumulated error code 128. In at least one variation, the bits set by the interposer 108 in the data or signals of the virtual bit vector for a particular request begin at the offset for the request and include consecutive bits for each byte (in size) of the request. Thus, as each request is received, the interposer 108 updates the accumulated I/O count 206 and the accumulated error code 128, e.g., based on the bits set in the data or signals of the virtual bit vector for the particular request. In other words, in one or more implementations, the accumulated error code 128 is produced by the error-detection logic 122 based on a number of bytes associated with a request and also based on an indication of which particular bytes of the memory 106 are requested by the request.

In accordance with the described techniques, the interposer 108 uses the accumulated error code 128 to validate the I/O operation, such as after the interposer 108 receives an indication (e.g., from the I/O device 102) that the I/O operation is complete. For example, in one or more variations, the interposer 108 validates the I/O operation in accordance with the following discussion.

The interposer 108 also uses the error-detection logic 122 to produce the I/O level error code 204. To do so, the interposer 108 receives or otherwise generates a second virtual bit vector for each request, the interposer 108 then provides the second virtual bit vector as input to the error-detection logic 122 which processes the second virtual bit vector (e.g., with the I/O level error code 204), and the interposer 108 obtains the I/O level error code 204 (e.g., a cyclic redundancy code (CRC)) from output of the error-detection logic 122. By processing the input second virtual bit vector and the I/O level error code 204, according to one or more error-detection algorithms (e.g., CRC), the I/O level error code 204 output by the error-detection logic 122 is an update to the I/O level error code 204 provided as input. In contrast to the first virtual bit vector, in one or more implementations, the second virtual bit vector is a bit vector having a number of bits which corresponds to a size in bytes of a request and each bit of this bit vector is set. Thus, in one or more implementations, the I/O level error code 204 is produced by the error-detection logic 122 based on a number of bytes associated with a request and is agnostic to which particular bytes of the memory 106 are requested. The I/O level error code 204 is produced as bits are set sequentially and are independent of addresses in memory 106 being accessed by each of the requests 116.

Consider again the example in which the I/O operation corresponds to a two gigabyte I/O operation and in which the interposer 108 receives a request to access 16 bytes of the memory 106 as part of the I/O operation. In this example, the interposer 108 provides a 16-bit bit vector, with each bit set (e.g., to '1') as input to the error-detection logic 122 to update the I/O level error code 204. In one or more implementations, the interposer 108, with each request, sequentially sets bits in a second virtual bit vector (e.g., a bit string) independent of addresses associated with the requests, as the requests are received by the interposer 108, that correspond to a number of bytes of the request as input to the error-detection logic 122 to update the I/O level error code 204. Accordingly, the described techniques also involve storing a second error code and avoid storing an actual virtual bit vector and/or a second virtual bit vector having a size of the I/O operation. In so doing, these techniques reduce a storage burden on the interposer 108 by storing solely the accumulated error code 128 and the I/O level error code 204, without storing an actual bit vector of the I/O operation.

In one or more implementations, the interposer 108 compares the accumulated I/O count 206 to the I/O size 202 and compares the accumulated error code 128 to the I/O level error code 204. If the accumulated I/O count 206 is not equal to the I/O size 202, then the interposer 108 outputs an indication that the I/O operation is invalid, e.g., the I/O validity indicator 130 indicates an invalid I/O operation. If the accumulated error code 128 (e.g., an incremental CRC) is not equal to the I/O level error code 204 (e.g., a CRC), then the interposer 108 outputs an indication that the I/O operation is invalid, e.g., the I/O validity indicator 130 indicates an invalid I/O operation. Thus, in scenarios where the accumulated I/O count 206 is equal to the I/O size 202 but the accumulated error code 128 is not equal to the I/O level error code 204, the interposer 108 outputs an indication that the I/O operation is invalid, e.g., the I/O validity indicator 130 indicates an invalid I/O operation. However, if both the accumulated I/O count 206 equals the I/O size 202 and the accumulated error code 128 equals the I/O level error code 204, then the interposer 108 outputs an indication that the I/O operation is valid.

Having discussed an example system and an interposer for implementing memory access validation for I/O operations using an interposer, consider a discussion of the following procedures.

Figure 3:
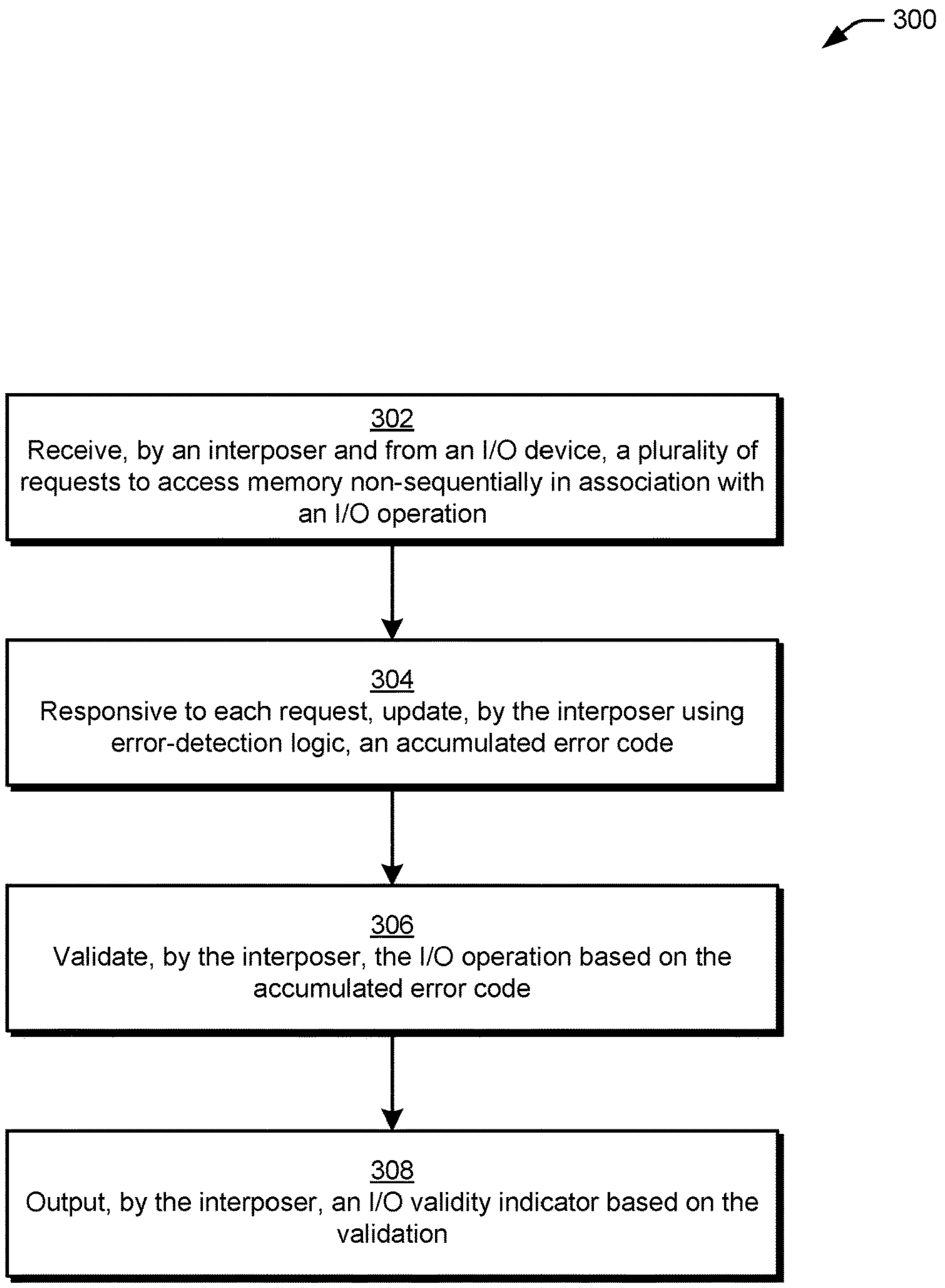
FIG. 3 depicts a procedure in a non-limiting example implementation of memory access validation for I/O operations using an interposer.

FIG. 3 depicts a procedure in a non-limiting example 300 implementation of memory access validation for I/O operations using an interposer.

A plurality of requests is received by an interposer (block 302). In accordance with the principles discussed herein, the plurality of requests is received from an I/O device to access memory non-sequentially in association with an I/O operation. By way of example, the interposer 108 receives a plurality of the requests 116 from the I/O device 102 (e.g., generated and sent by the direct memory access engine 112) in connection with the I/O operation instructed based on the I/O command 114. In at least one scenario, at least two of the requests 116 received consecutively request access to non-sequential portions of the memory 106, e.g., a first request requests access to a first portion of the memory 106 allocated for the I/O operation and a second request requests access to a second portion of the memory 106 allocated for the I/O operation that precedes the first portion or that is subsequent to the first portion and is not directly adjacent (contiguous) to the first portion (e.g., there is a portion of memory between the first and second portions).

An accumulated error code is updated by the interposer using error-detection logic responsive to each request (block 304). By way of example, as the requests 116 are received, the interposer 108 uses the error-detection logic 122 to update the accumulated error code 128, e.g., on a per-request basis.

The I/O operation is validated by the interposer based on the accumulated error code (block 306). By way of example, the interposer 108 validates the I/O operation based on the accumulated error code 128. For instance, the interposer 108 compares the accumulated error code 128 to the I/O level error code 204 to validate the I/O operation.

An I/O validity indicator is output by the interposer based on validation of the I/O operation (block 308). By way of example, the interposer 108 outputs the I/O validity indicator 130 based on the validation performed at block 306, and the I/O validity indicator 130 indicates whether the I/O operation is valid or invalid.

Figure 4:
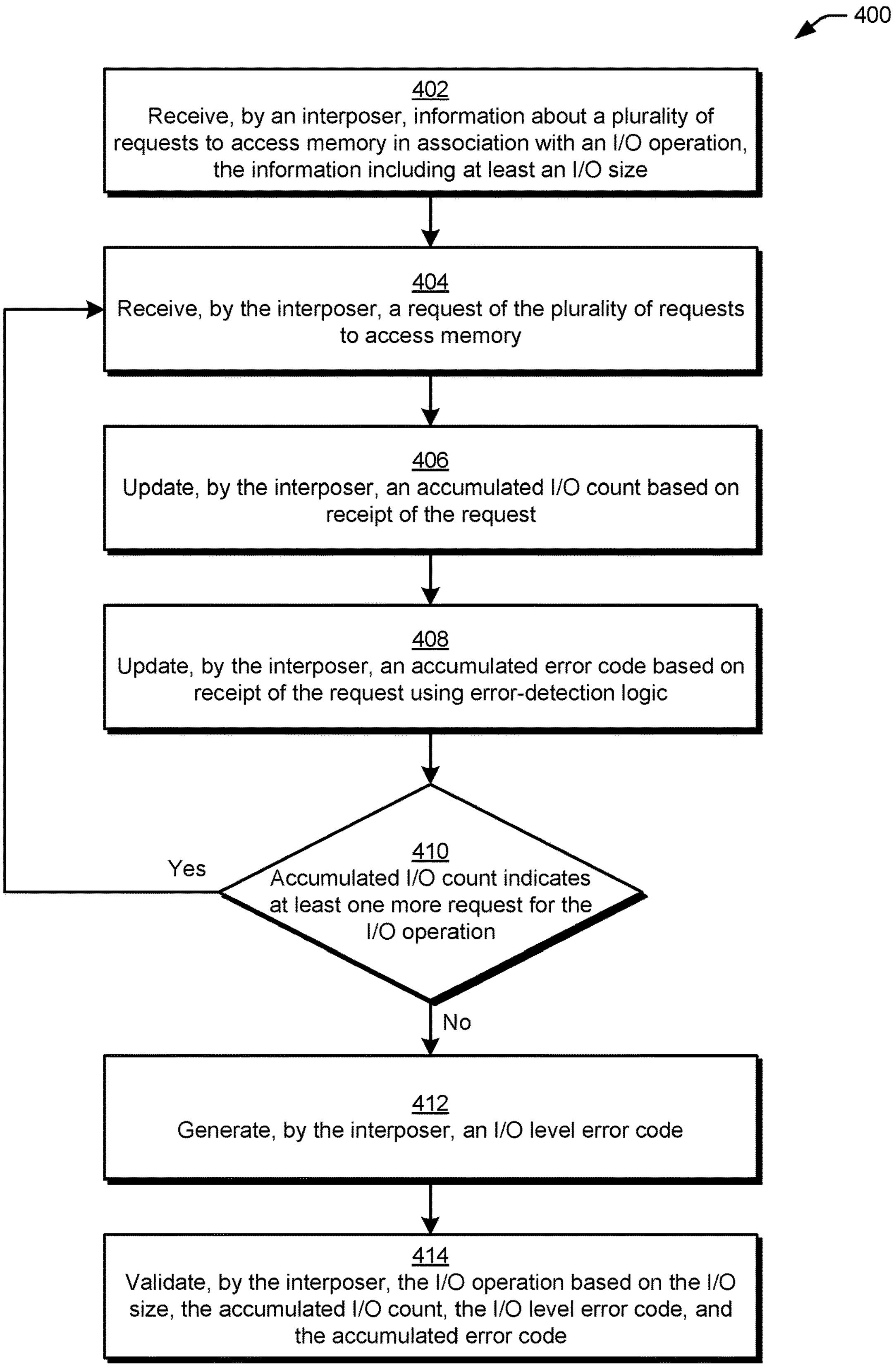
FIG. 4 depicts a procedure in another non-limiting example implementation of memory access validation for I/O operations using an interposer.

FIG. 4 depicts a procedure in another non-limiting example 400 implementation of memory access validation for I/O operations using an interposer.

Information about a plurality of requests to access memory in association with an I/O operation is received by an interposer (block 402). In accordance with the principles discussed herein, the information includes at least an I/O size. By way of example, the interposer 108 receives the I/O size 202 via the I/O command 114 from the processor 104.

In one or more implementations, iterations of blocks 404-410 are performed until at least one indication that the I/O operation is complete. A request of the plurality of requests to access memory is received by an interposer (block 404). By way of example, the interposer 108 receives one request of the requests 116.

An accumulated I/O count is updated by the interposer based on receipt of the request (block 406). By way of example, the interposer 108 updates the accumulated I/O count 206 based on receipt of the request at block 404.

An accumulated error code is updated by the interposer using error-detection logic based on receipt of the request (block 408). By way of example, the interposer 108 updates the accumulated error code 128 using the error-detection logic 122 based on receipt of the request at block 404.

A determination is made (at block 410), regarding whether the accumulated I/O count indicates at least one more request for the I/O operation, e.g., whether the accumulated I/O count is less than the I/O size. By way of example, the interposer 108 compares the accumulated I/O count 206 to the I/O size 202. If a determination is made that the I/O count indicates that there is at least one more request for the I/O operation (e.g., "yes" at block 410), then the interposer 108 waits for another request from the I/O device 102, e.g., the procedure returns to block 404. If, however, a determination is made that the I/O count indicates that there is not at least one more request for the I/O operation (e.g., "no" at block 410), then the interposer 108 exits the loop of blocks 404-410 and begins to perform the portions of the procedure of the subsequent blocks. Alternatively or in addition, the interposer 108 exits the loop of blocks 404-410 and enters block 412 based on receipt of an indication from the I/O device 102 indicating that the I/O operation is complete.

An I/O level error code is generated by the interposer (block 412). By way of example, the interposer 108 generates the I/O level error code 204 using the error-detection logic 122, such as in the manner discussed in more detail above, e.g., sequentially and as the requests are received.

The I/O operation is validated by the interposer based on the I/O size, the accumulated I/O count, the I/O level error code, and the accumulated error code (block 414). By way of example, the interposer 108 validates the I/O operation (e.g., instructed by the I/O command 114) based on the I/O size 202, the accumulated I/O count 206, the I/O level error code 204, and the accumulated error code 128.

Figure 5:
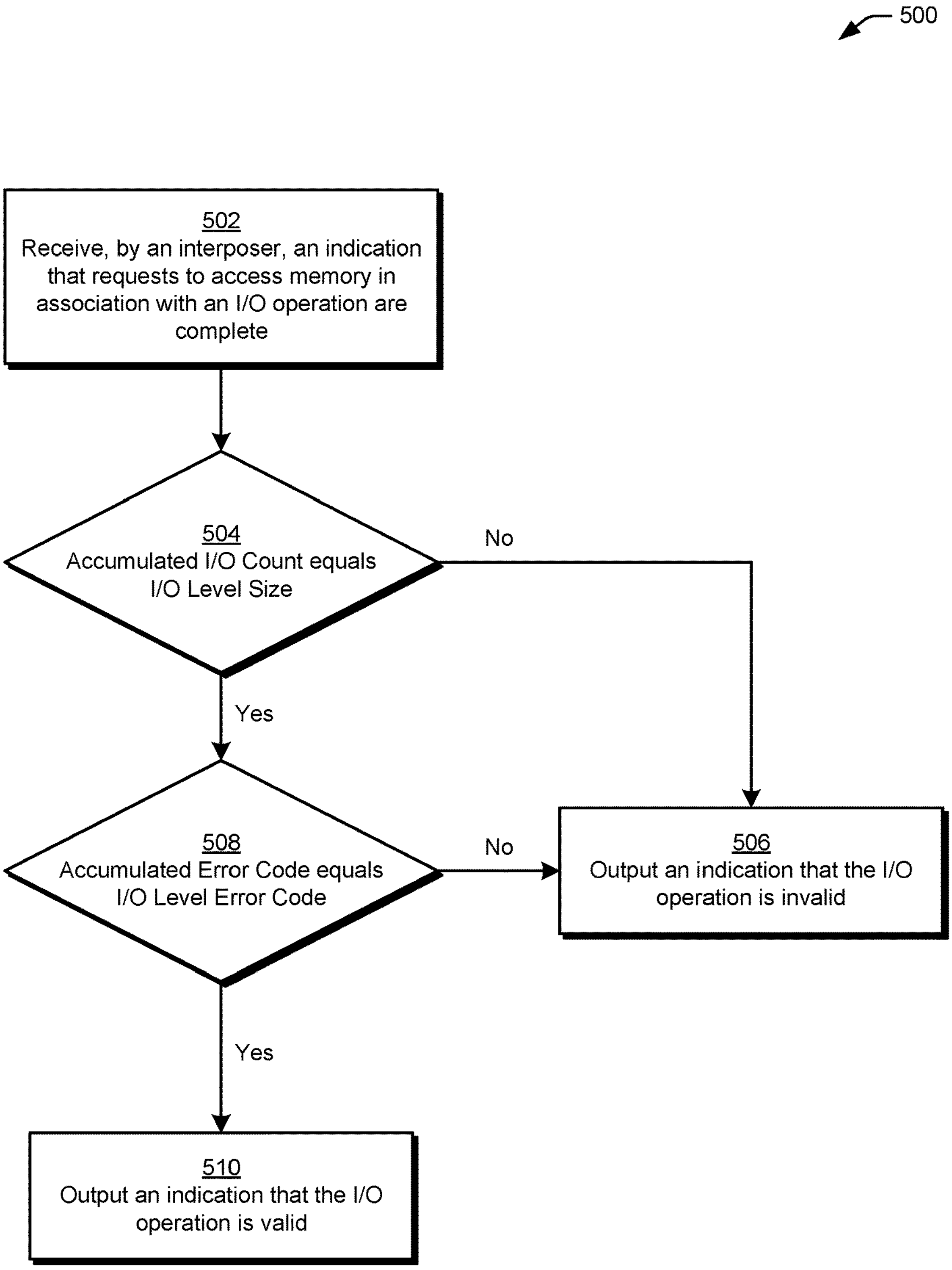
FIG. 5 depicts a procedure in another non-limiting example implementation of memory access validation for I/O operations using an interposer.

FIG. 5 depicts a procedure in another non-limiting example 500 implementation of memory access validation for I/O operations using an interposer.

An indication is received by an interposer (block 502). In accordance with the principles discussed herein, the indication indicates that requests to access memory in association with an I/O operation are complete. By way of example, the interposer 108 receives an indication that requests from the direct memory access engine 112 of the I/O device 102 to access the memory 106 in connection with an I/O operation are complete.

A determination is made (at block 504) regarding whether an accumulated I/O count equals an I/O level size. For example, the interposer 108 determines whether the accumulated I/O count 206 equals the I/O size 202. If a determination is made that the accumulated I/O count 206 equals the I/O size 202 (e.g., "yes" at block 504), then the procedure proceeds to block 508. If a determination is made that the accumulated I/O count 206 is not equal to the I/O size 202 (e.g., "no" at block 504), then the procedure proceeds to block 506.

At block 506, an indication is output that the I/O operation is invalid. By way of example, the interposer 108 outputs the I/O validity indicator 130, and the I/O validity indicator 130 is configured by the interposer 108 to indicate that the I/O operation is invalid.

A determination is made (at block 508) regarding whether an accumulated error code equals an I/O level error code. For example, the interposer 108 determines whether the accumulated error code 128 equals the I/O level error code 204. If a determination is made that the accumulated error code 128 equals the I/O level error code 204 (e.g., "yes" at block 508), then the procedure proceeds to block 508. If, however, a determination is made that the accumulated error code 128 is not equal to the I/O level error code 204 (e.g., "no" at block 508), then the procedure proceeds to block 506, e.g., an indication is output that the I/O operation is invalid.

At block 510, an indication is output that the I/O operation is valid. By way of example, the interposer 108 outputs the I/O validity indicator 130, and the I/O validity indicator 130 is configured by the interposer 108 to indicate that the I/O operation is valid.

It will be understood that many variations are possible based on the disclosure herein. Although features and controls are described above in particular combinations, each feature or control is usable alone without the other features and controls or in various combinations with or without other features and controls.

The various functional units illustrated in the figures and/or described herein (including, where appropriate, the I/O device 102 with the direct memory access engine 112, the processor 104 with the device driver 110, the memory 106, and the interposer with the translation logic 118 and the error-detection logic 122) are implemented in any of a variety of different manners such as hardware circuitry, software or firmware executing on a programmable processor, or any combination of two or more of hardware, software, and firmware. The methods provided are implemented in any of a variety of devices, such as a general-purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general-purpose computer or a processor. Examples of non-transitory computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A device comprising:

an interposer disposed logically between an input/output device and a memory to:

receive a plurality of requests from the input/output device to access the memory non-sequentially in association with an input/output operation;

responsive to each request of the plurality of requests, incrementally update an accumulated error code based at least in part on an indication of which particular bytes of the memory are requested in each request of the plurality of requests, wherein the accumulated error code is updated incrementally with each request based on at least one error detection algorithm; and output an input/output validity indicator for the input/output operation based on the accumulated error code.

2. The device of claim 1, wherein the interposer is further configured to validate the input/output operation based on the accumulated error code.

3. The device of claim 1, wherein the plurality of requests is received from a direct memory access engine of the input/output device.

4. The device of claim 1, wherein the input/output device is a non-volatile memory express (NVMe) device and the interposer is an NVMe interposer.

5. The device of claim 1, wherein error-detection logic of the interposer performs incremental cyclic redundancy code (CRC) calculations associated with the at least one error detection algorithm for each request on a per-request basis as a request is received to update the accumulated error code.

6. The device of claim 5, wherein the error-detection logic comprises a linear feedback shift register (LFSR) for performing the incremental cyclic redundancy code (CRC) calculations.

7. The device of claim 1, wherein the interposer is further configured to validate the input/output operation based on the accumulated error code and an input/output level error code.

8. The device of claim 7, wherein the accumulated error code and the input/output level error code are cyclic redundancy codes (CRCs).

9. The device of claim 7, wherein the interposer stores both the accumulated error code and the input/output level error code without storing a virtual bit vector having a number of bits which corresponds to a number of bytes of the input/output operation.

10. The device of claim 7, wherein:

error-detection logic of the interposer updates the accumulated error code for a request according to the at least one error detection algorithm based on a number of bytes of memory requested for access by the request and the indication of which particular bytes of the memory are requested; and the error-detection logic updates the input/output level error code for the request based on the number of bytes of memory requested.

11. The device of claim 10, wherein the error-detection logic updates the input/output level error code for the request based on the number of bytes of memory requested by the request and agnostic to which particular bytes of the memory are requested.

12. The device of claim 1, wherein the interposer is further configured to translate the plurality of requests to produce a plurality of translated requests for accessing respective portions of the memory.

13. The device of claim 12, wherein the plurality of translated requests are formatted according to a different protocol than the plurality of requests.

14. The device of claim 1, wherein the indication of which particular bytes of the memory are requested indicates an offset and a number of bytes accessed by the request.

15. The device of claim 1, wherein the input/output device is configured to perform the input/output operation again in response to the input/output validity indicator indicating that the input/output operation is invalid.

16. A system comprising:

a memory;

an input/output device to generate a plurality of requests to access the memory non-sequentially in association with an input/output operation; and an interposer disposed logically between the memory and the input/output device, the interposer having error-detection logic to incrementally update an accumulated error code based at least in part on an indication of which particular bytes of the memory are requested in each request of the plurality of requests and output an input/output validity indicator based on the accumulated error code, wherein the accumulated error code is updated incrementally with each request of the plurality of requests based on at least one error detection algorithm.

17. The system of claim 16, wherein the interposer is further configured to use the error-detection logic to update an input/output level error code based on each request, the interposer updating the input/output level error code based on different input information than the accumulated error code.

18. The system of claim 17, wherein the interposer is further configured to validate the input/output operation based on both the accumulated error code and the input/output level error code.

19. The system of claim 17, wherein the interposer is further configured to validate the input/output operation based on whether the accumulated error code and the input/output level error code are equal.

20. A method comprising:

receiving, by an interposer and from an input/output device, a plurality of requests to access memory non-sequentially in association with an input/output operation;

responsive to each request of the plurality of requests, incrementally updating an accumulated error code based at least in part on an indication of which particular bytes of the memory are requested in each request of the plurality of requests, wherein the accumulated error code is updated incrementally with each request based on at least one error detection algorithm; and outputting, by the interposer, an input/output validity indicator based on the accumulated error code.

* * * * *